United States Patent [19]

Booy

[11] 4,085,462

[45] Apr. 18, 1978

[54] APPARATUS

[75] Inventor: Max Lorenz Booy, Wilmington, Del.

[73] Assignee: E. I. Du Pont de Nemours and Company, Wilmington, Del.

[21] Appl. No.: 774,623

[22] Filed: Mar. 4, 1977

[51] Int. Cl.² .................................................. B01F 15/02
[52] U.S. Cl. ........................................ 366/174; 366/340
[58] Field of Search ............................. 259/4 R, 18, 36; 48/180; 137/604; 138/38, 42

[56] References Cited

U.S. PATENT DOCUMENTS

| | | | |
|---|---|---|---|
| 2,739,884 | 3/1956 | Davis | 48/180 |
| 3,473,567 | 10/1969 | Kitchenmaster | 137/604 |
| 3,478,963 | 11/1969 | Winn | 259/4 R |
| 3,794,299 | 2/1974 | Wagner | 259/4 R |
| 3,886,972 | 6/1975 | Scott | 137/604 |

Primary Examiner—Robert W. Jenkins

[57] ABSTRACT

An apparatus located within a conduit carrying a primary fluid is used to disperse a secondary fluid into the primary fluid. The apparatus includes an inverted cup to which are attached inverted troughs with serrated edges. Secondary fluid flows into the cup and outwardly through the troughs. The serrated edges form the secondary fluid into individual streams for dispersion into the primary fluid.

4 Claims, 6 Drawing Figures

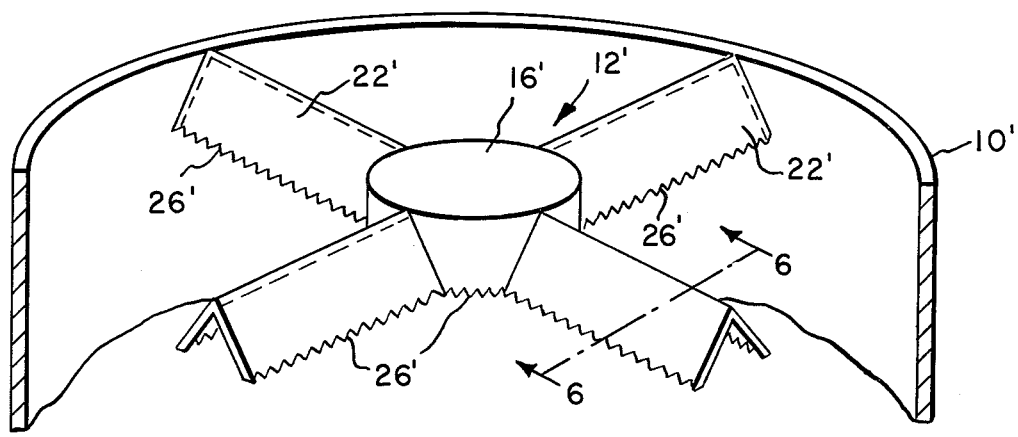
FIG. 4
FIG. 5
FIG. 6
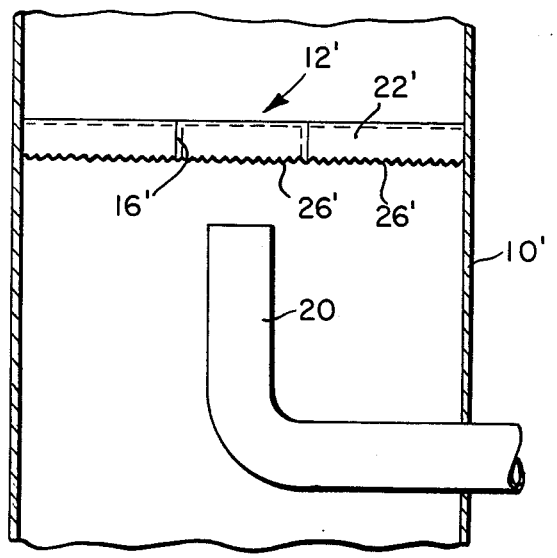
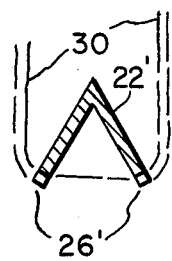

APPARATUS

BACKGROUND OF THE INVENTION

This invention relates to mixers and, more particularly, to an apparatus for mixing fluids in a conduit.

The apparatus of this invention has been found to be particularly useful for mixing salt solution with recirculating prepolymer in a reactor thermosiphon as used in the continuous polymerization system disclosed in U.S. Pat. No. 3,900,450.

SUMMARY OF THE INVENTION

According to the invention, the mixer apparatus is positioned in a conduit for adding a secondary fluid to the primary fluid carried in the conduit which flows from an upstream direction past the mixer apparatus. The apparatus includes an open cup defined by a continuous side wall and a bottom wall, and a plurality of troughs attached to spaced locations on the side walls of the cup. There are openings in the side wall at the locations where the troughs are attached to allow flow through from the cup to the troughs. The cup and trough openings face in the upstream direction and a means is provided for directing a stream of secondary fluid to be added to the primary fluid into the cup. The edges of the troughs and cup facing the upstream direction are serrated so that the secondary fluid to be added flows into the main stream as small streams formed by the serrations.

BRIEF DESCRIPTION OF THE DRAWING

FIG. 4 is a perspective view of another embodiment of the invention;

FIG. 5 is an elevation view sectioned through the conduit of FIG. 4; and

FIG. 6 is a section taken along line 6—6 of FIG. 4.

DETAILED DESCRIPTION OF THE PREFERRED EMBODIMENT

Figure 1:
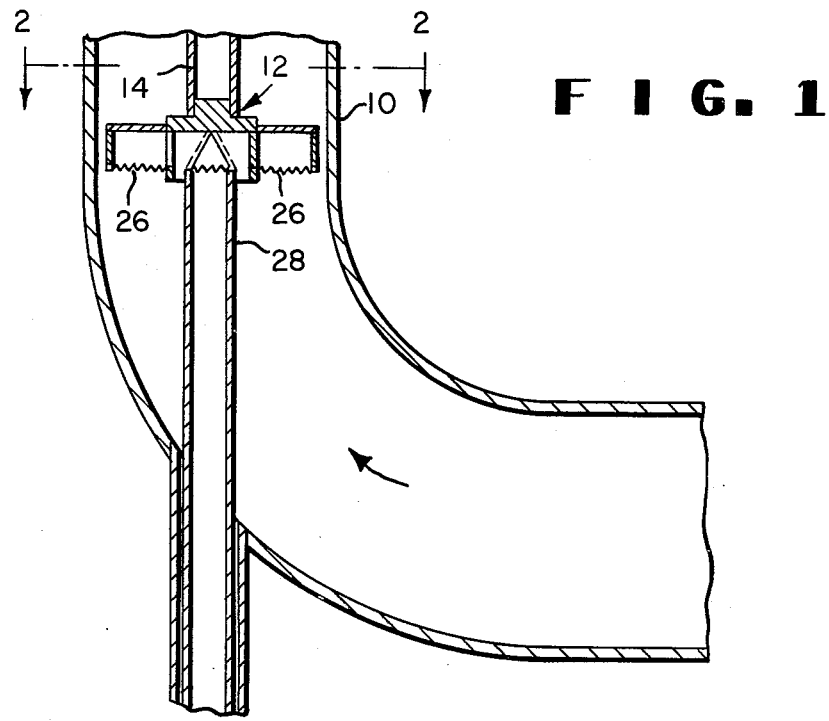
FIG. 1 is an elevation in section through a conduit having the mixer apparatus of the invention positioned therein.

FIG. 1 shows a relatively large diameter conduit 10 in the form of an elbow. Primary fluid is traveling in the conduit in the direction of the arrow. The mixer apparatus of the invention generally designated as 12 is centrally positioned in the conduit 10 by means of rod 14 attached to the mixer apparatus and to the conduit by a spider (not shown).

Figure 2:
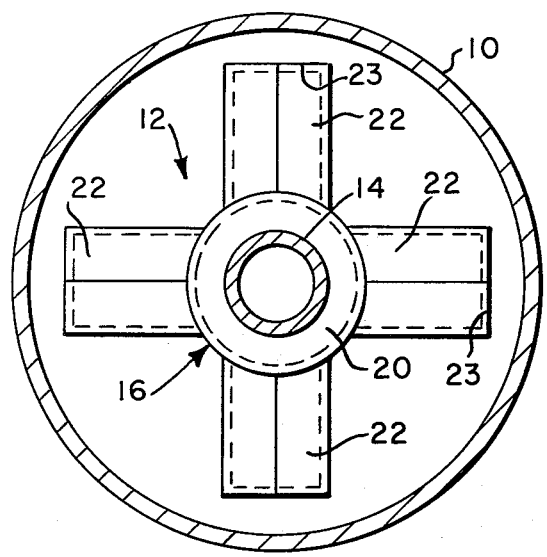
FIG. 2 is a plan view taken along line 2—2 of FIG. 1.
Figure 3:
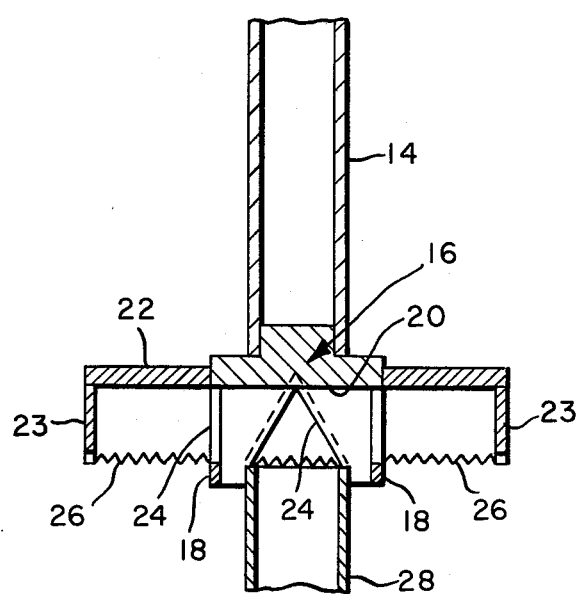
FIG. 3 is an enlarged elevation view partially in section of the mixer in FIG. 1.

The mixing apparatus as best seen in FIGS. 2 and 3 comprises an open cup 16 defined by a continuous side wall 18 and a bottom wall 20. Four V-shaped troughs 22 are attached to the side wall 18 with the trough openings facing in the same direction as the opening of the cup. Angular cutouts 24 form openings in the side wall 18 to provide communication between the cup 16 and the troughs 22. The equal length troughs 22 are equispaced around and extend outwardly from the cup 16 toward the inner wall of conduit 10 and terminate in an end wall 23 spaced from the inner wall of the conduit. The edges of the trough have serrations 26 formed therein. A pipe 28 having a diameter smaller than the opening of cup 16 extends through the wall of conduit 10 centrally into the conduit and terminates just within cup 16 (FIG. 1). Pipe 28 is connected to a source (not shown) of secondary fluid to be added to the fluid flowing in conduit 10.

In operation, a primary fluid is flowing in conduit 10 in the direction of the arrow. A secondary fluid is directed into cup 16 through conduit 28. The secondary fluid flows from cup 16 along troughs 22 toward the end walls 23 and over the edges of the troughs through the serrations 26 as individual streams into the primary fluid stream.

The above described apparatus is of simple construction, and is capable of mixing liquid streams which differ greatly in viscosity and flow rates, as well as being capable of handling dispersions, slurries and other heterogeneous liquid streams.

In an alternate embodiment shown in FIGS. 4–6, the troughs 22' of mixer apparatus 12' are welded to the inner wall of the pipe 10'. Serrations 26' are provided in the edge of the cup as well as the edges of the troughs. Conduit 28' for directing secondary liquid into cup 16' terminates somewhat below the cup. FIG. 6 illustrates the individual fluid streams 30 as formed by secondary fluid flowing through serrations 26'.

What is claimed is:

1. In a conduit for carrying a primary fluid flowing from an upstream direction, an apparatus positioned in said conduit for adding a secondary fluid to the primary fluid in said conduit comprising: an open cup positioned in said conduit, said cup being defined by a continuous side wall and a bottom wall; a plurality of troughs attached to spaced locations on and extending outwardly from said side wall, there being openings in said side wall at said spaced locations to allow communication from said cup to said troughs, each of said troughs having openings defined by edges, said edges having serrations therein, said trough openings and said cup opening facing the upstream direction of the conduit; and means for directing a stream of fluid to be added to the fluid in said conduit into said cup.

2. The apparatus of claim 1, said troughs being of equal length and being equispaced around said side wall.

3. The apparatus of claim 2, there being four troughs.

4. The apparatus of claim 3, said apparatus being centrally positioned in said conduit.

* * * * *